United States Patent
Ouyang et al.

(10) Patent No.: US 11,587,550 B2
(45) Date of Patent: Feb. 21, 2023

(54) METHOD AND APPARATUS FOR OUTPUTTING INFORMATION

(71) Applicant: Apollo Intelligent Connectivity (Beijing) Technology Co., Ltd., Beijing (CN)

(72) Inventors: Nengjun Ouyang, Beijing (CN); Ke Zhao, Beijing (CN); Rong Liu, Beijing (CN)

(73) Assignee: Apollo Intelligent Connectivity (Beijing) Technology Co., Ltd., Beijing (CN)

(*) Notice: Subject to any disclaimer, the term of this patent is extended or adjusted under 35 U.S.C. 154(b) by 0 days.

(21) Appl. No.: 17/117,786

(22) Filed: Dec. 10, 2020

(65) Prior Publication Data

US 2021/0390947 A1    Dec. 16, 2021

(30) Foreign Application Priority Data

Jun. 10, 2020 (CN) .................... 202010522739.4

(51) Int. Cl.
*G10L 15/05*    (2013.01)
*G10L 15/06*    (2013.01)
*G10L 17/04*    (2013.01)
*G10L 15/08*    (2006.01)

(52) U.S. Cl.
CPC ........... *G10L 15/05* (2013.01); *G10L 15/063* (2013.01); *G10L 17/04* (2013.01); *G10L 2015/088* (2013.01)

(58) Field of Classification Search
None
See application file for complete search history.

(56) References Cited

U.S. PATENT DOCUMENTS

| 9,697,828 B1* | 7/2017 | Prasad ................... G10L 15/18 |
| 10,586,534 B1* | 3/2020 | Argyropoulos ......... G10L 15/22 |
| 10,984,086 B1* | 4/2021 | Gorsica ................... G06F 3/167 |

(Continued)

FOREIGN PATENT DOCUMENTS

| CN | 108320733 A | 7/2018 |
| CN | 109637537 A | 4/2019 |

(Continued)

OTHER PUBLICATIONS

European Search Report dated May 14, 2021 in corresponding European Patent Application No. 20213103.3 (five pages).

*Primary Examiner* — Jakieda R Jackson
(74) *Attorney, Agent, or Firm* — Kilpatrick Townsend & Stockton LLP (57) ABSTRACT

A method and an apparatus for outputting information are provided. The method includes acquiring voice information received within a preset time period before a device is awakened, where the device is provided with a wake-up model for outputting preset response information when a preset wake-up word is received; performing speech recognition on the voice information to obtain a recognition result; extracting feature information of the voice information in response to determining that the recognition result does not include a preset wake-up word; generating a counterexample training sample according to the feature information; and training the wake-up model using a counter-example training sample, and outputting the trained wake-up model.

15 Claims, 5 Drawing Sheets

(56) References Cited

U.S. PATENT DOCUMENTS

| | | | |
|---|---|---|---|
| 2010/0278016 A1* | 11/2010 | Sandu | H05B 47/16 368/10 |
| 2013/0080167 A1* | 3/2013 | Mozer | G10L 15/22 704/246 |
| 2014/0324858 A1* | 10/2014 | Kobayashi | H04N 21/4826 707/736 |
| 2019/0043492 A1* | 2/2019 | Lang | H04N 21/42203 |
| 2019/0130885 A1* | 5/2019 | Kemmerer | G10L 21/0208 |
| 2019/0214002 A1* | 7/2019 | Park | G10L 15/08 |
| 2019/0222756 A1* | 7/2019 | Moloney | G06K 9/00335 |
| 2019/0371342 A1* | 12/2019 | Tukka | H04M 1/724 |
| 2020/0005789 A1* | 1/2020 | Chae | G10L 15/30 |
| 2020/0013390 A1* | 1/2020 | Wang | G06N 3/04 |
| 2020/0034701 A1* | 1/2020 | Ritter | G06F 9/50 |
| 2020/0097822 A1* | 3/2020 | Vishnu | G06N 3/0481 |
| 2020/0098346 A1* | 3/2020 | Kemmerer | G10K 11/16 |
| 2020/0160863 A1* | 5/2020 | Lee | G10L 13/00 |
| 2020/0221223 A1* | 7/2020 | Zhou | H04R 5/027 |
| 2021/0020162 A1* | 1/2021 | Griffin | G10L 15/063 |
| 2021/0027205 A1* | 1/2021 | Sevakula | G06N 3/0445 |
| 2021/0110409 A1* | 4/2021 | Mroueh | G16B 50/00 |
| 2021/0191845 A1* | 6/2021 | Bach | G06F 16/9024 |
| 2021/0249005 A1* | 8/2021 | Bromand | H04R 3/005 |
| 2021/0303447 A1* | 9/2021 | Haze | G06F 11/3664 |

FOREIGN PATENT DOCUMENTS

| | | |
|---|---|---|
| CN | 110097876 A | 8/2019 |
| CN | 110517670 A | 11/2019 |

\* cited by examiner

METHOD AND APPARATUS FOR OUTPUTTING INFORMATION

CROSS-REFERENCE TO RELATED APPLICATIONS

This application claims the priority of Chinese Patent Application No. 202010522739.4, titled "METHOD AND APPARATUS FOR OUTPUTTING INFORMATION," filed on Jun. 10, 2020, the content of which is incorporated herein by reference in its entirety.

TECHNICAL FIELD

Embodiments of the present disclosure relate to the field of computer technology, in particular, to the field of device wakeup, and more particularly, to a method and apparatus for outputting information.

BACKGROUND

With the increasing demand for travel comfort and the increasing popularity of the on-board entertainment information system carrying voice assistants, people have gradually relied on the use of voice assistants during travel to complete some on-board controls, such as navigation, listening to music, and controlling air conditioning, which are increasingly accepted.

SUMMARY

Embodiments of the present disclosure provide a method, apparatus, server, and storage medium for outputting information.

According to a first aspect, there is provided a method for outputting information, including: acquiring voice information received within a preset time period before a device is awakened, wherein the device is provided with a wake-up model for outputting preset response information when a preset wake-up word is received; performing speech recognition on the voice information to obtain a recognition result; extracting feature information of the voice information in response to determining that the recognition result does not include the preset wake-up word; generating a counterexample training sample based on the feature information; and training the wake-up model using the counterexample training sample, and outputting the trained wake-up model.

According to a second aspect, there is provided an apparatus for outputting information, including: an acquiring unit configured to acquire voice information received within a preset time period before a device is awakened, wherein the device is provided with a wake-up model for outputting preset response information when a preset wake-up word is received; a recognition unit configured to perform speech recognition on the voice information to obtain a recognition result; an extraction unit configured to extract feature information of the voice information in response to determining that the recognition result does not include the preset wake-up word; a training unit configured to generate a counterexample training sample based on the feature information; and an output unit configured to train the wake-up model using the counterexample training sample and output the trained wake-up model.

According to a third aspect, there is provided a server including one or more processors; where the one or more programs, when executed by the one or more processors, cause the one or more processors to implement the method according any of the embodiments in the first aspect.

According to a fourth aspect, there is provided a computer readable medium storing a computer program, where the program, when executed by a processor, implements the method according to any of the embodiments of the first aspect.

It should be understood that the description in this section is not intended to identify key or critical features of the embodiments of the disclosure, nor is it intended to limit the scope of the disclosure. Other features of the present disclosure will become readily apparent from the following description.

BRIEF DESCRIPTION OF THE DRAWINGS

Other features, objects, and advantages of the present disclosure will become more apparent by reading the detailed description of non-limiting embodiments made with reference to the following drawings.

DETAILED DESCRIPTION OF EMBODIMENTS

The present disclosure is described in further detail below with reference to the accompanying drawings and examples. It should be understood that the specific embodiments described herein are merely illustrative of the related disclosure and are not restrictive of the disclosure. It also should be noted that, for ease of description, only parts related to the disclosure are shown in the drawings.

It should be noted that the embodiments in the present disclosure and the features in the embodiments may be combined with each other without conflict. The present disclosure will now be described in detail with reference to the accompanying drawings and examples.

According to the technology of some embodiments of the present disclosure, the problem that the existing method for waking up device is prone to falsely wake up the device is solved, and the wake-up model can be trained by using voice information during false awakening as a counterexample sample, so that additional corpus recording is not required, cost is saved, and false awakening can be automatically suppressed, thereby improving the accuracy of wakeup.

Figure 1:
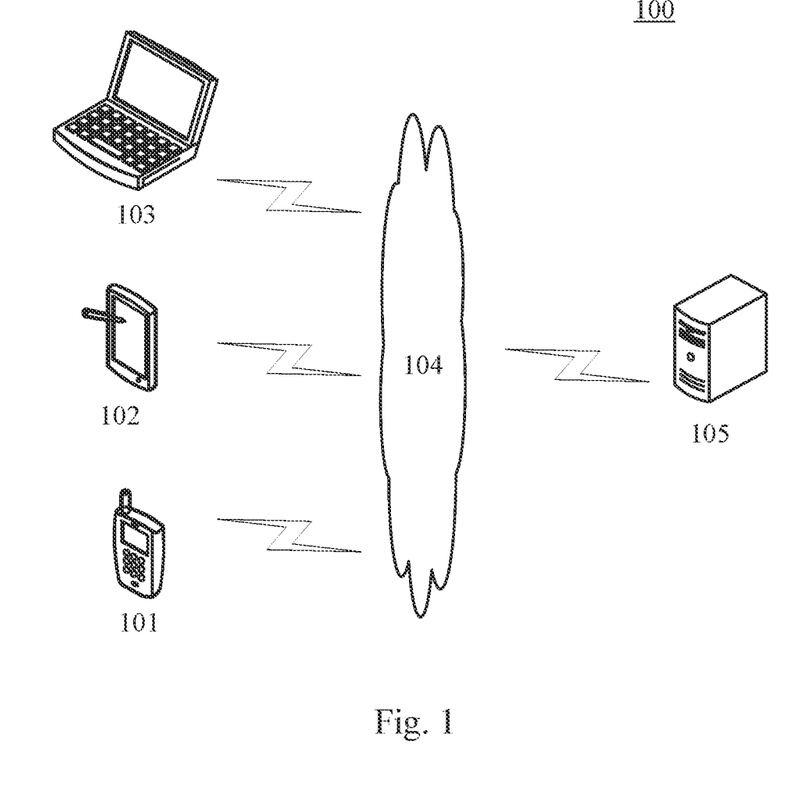
FIG. 1 is an example system architecture diagram in which an embodiment of the present disclosure may be applied.

FIG. 1 illustrates an example system architecture 100 in which an embodiment of a method for outputting information or an apparatus for outputting information of the present disclosure may be applied.

As shown in FIG. 1, the system architecture 100 may include terminal devices 101, 102, 103, a network 104, and a server 105. The network 104 serves as a medium for providing a communication link between the terminal devices 101, 102, 103 and the server 105. Network 104 may include various types of connections, such as wired, wireless communication links, or fiber optic cables, among others.

The user may interact with the server 105 through the network 104 using the terminal devices 101, 102, 103 to receive or send messages, etc. Various communication client applications, such as voice recognition applications, may be installed on the terminal devices 101, 102, 103. A microphone array or the like may also be mounted on the terminal devices 101, 102, 103.

The terminal devices 101, 102, 103 may be hardware or software. When the terminal devices 101, 102, and 103 are hardware, they may be various electronic devices supporting voice wake-up, including but not limited to a smartphone, a tablet computer, an electronic book reader, an in-vehicle computer, a laptop computer, a desktop computer, and the like. When the terminal devices 101, 102, and 103 are software, they may be installed in the electronic devices listed above. It may be implemented as a plurality of software pieces or software modules (e.g., for providing distributed services) or as a single software piece or software module, which is not specifically limited herein.

The server 105 may be a server providing various services, such as a backend voice server providing support for voice collected by a microphone array installed on the terminal devices 101, 102, 103. The backend voice server may perform processing such as analysis on received data such as voice, and feed back processing results (e.g., wake-up results) to the terminal devices 101, 102, and 103.

It should be noted that the server 105 may be hardware or software. When the server 105 is hardware, it may be implemented as a distributed server cluster of multiple servers, or it may be implemented as a single server. When the server 105 is software, it may be implemented as a plurality of software pieces or software modules (e.g., for providing distributed services), or it may be implemented as a single software piece or software module, which is not specifically limited herein.

It should be noted that the method for outputting information provided in some embodiments of the present disclosure is generally executed by the server 105. Accordingly, the apparatus for outputting information is generally disposed in the server 105.

It should be understood that the number of terminal devices, networks and servers in FIG. 1 is merely illustrative. There may be any number of terminal devices, networks, and servers as desired for implementation.

Figure 2:
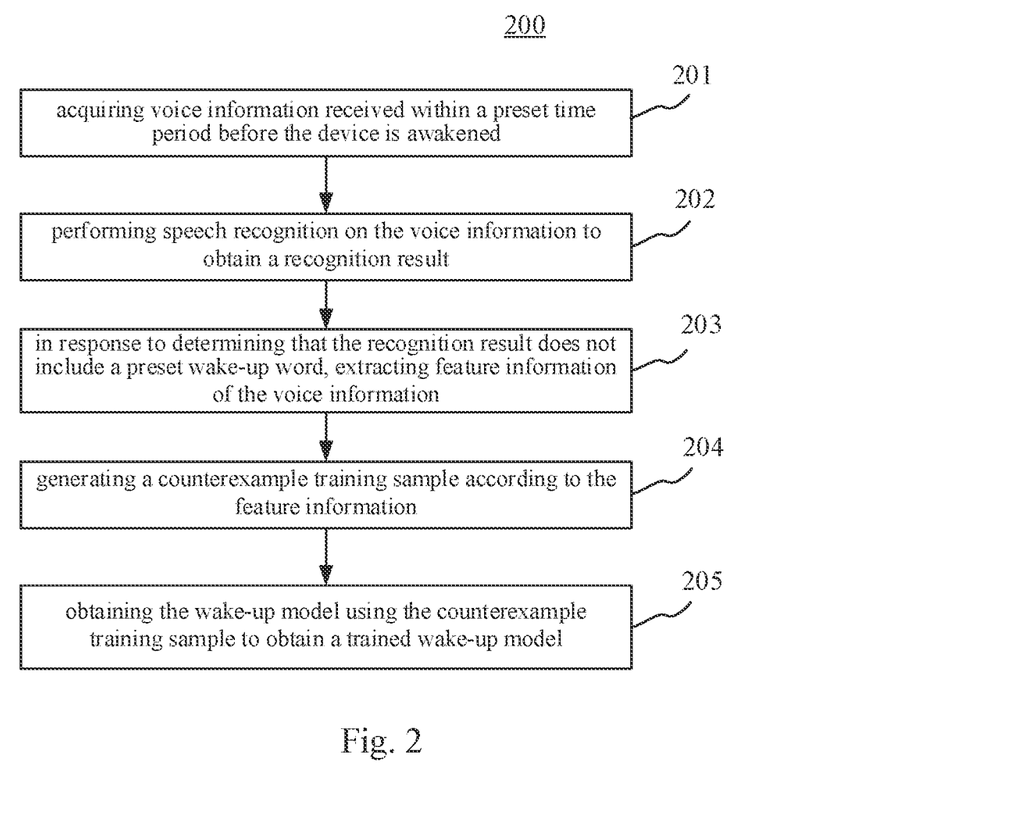
FIG. 2 is a flowchart of an embodiment of a method for outputting information according to some embodiments of the present disclosure.

With continuing reference to FIG. 2, a flow 200 of an embodiment of a method for outputting information in accordance with the present disclosure is shown. The method for outputting information according to the present embodiment includes the steps of 201 to 205.

Step 201 includes: acquiring voice information received within a preset time period before the device is awakened.

In the present embodiment, the execution body of the method for outputting information (for example, the server 105 shown in FIG. 1) may acquire voice information received within a predetermined time period before the device is awakened by a wired connection or a wireless connection. The device may be various terminal devices, such as in-vehicle computers, smartphones, and the like. The device may be provided with a speech wake-up model, which may be an algorithm including at least one neural network. The speech wake-up model is configured for outputting preset response information when a preset wake-up word is received. The preset wake-up word may be a pre-trained wake-up word. The preset response information may be, for example, output preset information. The output information may be voice information, text information, or a control instruction for hardware or software. The speech wake-up model may be pre-trained and sent to the device. The device may monitor voice information in real time and send the monitored voice information to the wake-up model. After receiving the voice information, the wake-up model may output preset response information indicating that the device is wakeup.

After being awakened, the device may send voice information received within a preset time period before waking, to the execution body. The preset time period may be any time period set according to an actual application scenario, for example, 10 minutes, 5 minutes, or the like.

Step 202 includes performing speech recognition on the voice information to obtain a recognition result.

After obtaining the voice information, the execution body may perform speech recognition on the voice to obtain a recognition result. In the present embodiment, the execution body may recognize the voice information using an existing speech recognition algorithm. The speech recognition algorithm described above may include a deep neural network or the like. The recognition result may include text.

Step 203 includes: in response to determining that the recognition result does not include a preset wake-up word, extracting feature information of the voice information.

The execution body may determine whether the recognition result includes a preset wake-up word or not. If the recognition result includes the preset wake-up word, it indicates that the device is normally awakened, and if the recognition result does not include the preset wake-up word, it indicates that the device is mistakenly awakened. In this case, the execution body may extract the feature information of the voice information. Specifically, the execution body may extract the feature information of the voice information using various speech processing algorithms, such as a convolutional neural network. The feature information may be various features capable of representing voice information, such as phonemes, syllable sequences, and the like.

Step 204 includes: generating a counterexample training sample according to the feature information.

After obtaining the feature information, the execution body may generate the counterexample training sample. Specifically, the execution body may directly take the feature information as the counter-example sample. Alternatively, the execution body may further process the feature information to obtain the counterexample training sample. For example, the execution body may remove noise from the feature information or extract a section of the feature information.

Step 205 includes: obtaining the wake-up model using the counterexample training sample to obtain a trained wake-up model.

After obtaining the counterexample training sample, the execution body may use the counterexample training sample to train the wake-up model to obtain the trained wake-up model. Specifically, the execution body may use the wake-up word included in the voice as an input, use the null information as an expected output to perform training to obtain the wake-up model.

Figure 3:
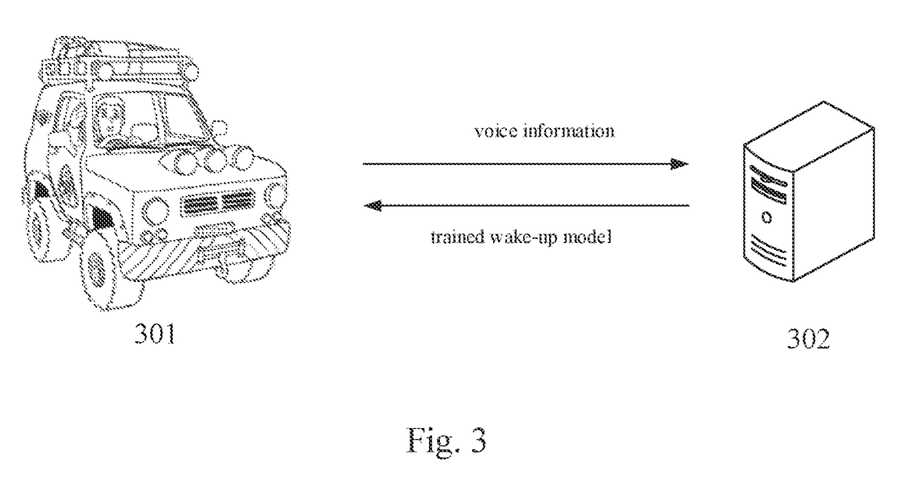
FIG. 3 is a schematic diagram of an application scenario of a method for outputting information according to some embodiments of the present disclosure.

With continued reference to FIG. 3, FIG. 3 is a schematic diagram of an application scenario of a method for outputting information according to the present embodiment. In the application scenario of FIG. 3, the user is talking in the vehicle, and the onboard computer suddenly sounds "I am", indicating that the onboard computer is incorrectly awakened. The on-board computer may compress and upload the voice information received within two seconds before waking to the server. The server may analyze the voice information to determine that a predetermined wake-up word is not included in the voice information. The feature information of the voice information is extracted, and a counterexample training sample is generated. A wake-up model is trained by using the counterexample training sample, and a trained wake-up model is obtained.

According to the method for outputting information provided in some embodiments of the present disclosure, the voice information during false wake-up may be used as the counterexample sample to train the wake-up model, no additional corpus recording is required, cost is saved, and false wake-up can be automatically suppressed, thereby improving the accuracy of wake-up.

Figure 4:
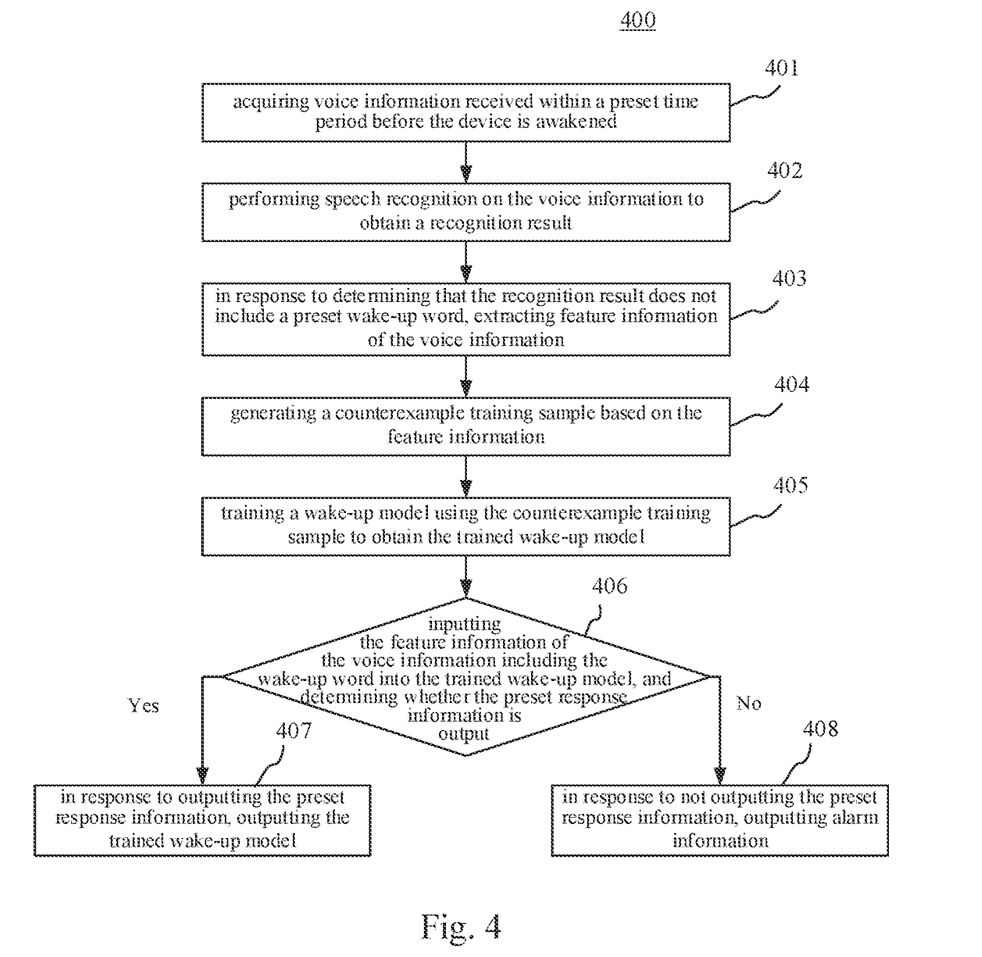
FIG. 4 is a flowchart of another embodiment of a method for outputting information according to some embodiments of the present disclosure.

With continuing reference to FIG. 4, a flow diagram 400 of another embodiment of a method for outputting information according to the present disclosure is shown. As shown in FIG. 4, the method for outputting information in the present embodiment may include the following steps 401 to 408.

Step 401 includes: acquiring voice information received within a preset time period before the device is awakened.

Step 402 includes: performing speech recognition on the voice information to obtain a recognition result.

Step 403: in response to determining that the recognition result does not include a preset wake-up word, extracting feature information of the voice information.

Step 404: generating a counterexample training sample based on the feature information.

Step 405: training a wake-up model using the counterexample training sample to obtain the trained wake-up model.

In some alternative implementations of the present embodiment, the execution body may implement step 405 through the following steps not shown in FIG. 2: determining a number of counterexample training samples; and training the wake-up model with the counterexample training samples in response to the number of counterexample training samples being greater than or equal to a preset number threshold.

In this implementation, the execution body may first determine the number of counterexample training samples. If the number is greater than a predetermined number threshold, the wake-up model may be trained using the counterexample training samples, which ensures the accuracy of the wake-up model.

Step 406 includes inputting the feature information of the voice information including the wake-up word into the trained wake-up model, and determining whether the preset response information is output.

In this embodiment, after obtaining the trained wake-up model, the execution body may input the feature information of the voice information including the wake-up word into the model, and determine whether the preset response information is output. That is, the execution body may verify the trained wake-up model, and if the preset response information is output, it indicates that the preset wake-up model has a good effect. If the preset response information cannot be output, it indicates that the wake-up model cannot work. If the preset response information is output, step 407 is performed, and if the preset response information is not output, step 408 is performed.

Step 407 includes in response to outputting the preset response information, outputting the trained wake-up model.

If the wake-up model outputs the preset response information, the execution body may output the trained wake-up model. For example, the trained wake-up model is sent to terminal devices for the terminal device to perform voice wake-up using the trained wake-up model.

Step 408 include in response to not outputting the preset response information, outputting alarm information.

If the wake-up model does not output the preset response information, it indicates that the wake-up model cannot work. In this case, the alarm information needs to be output. The alarm information is used for reminding a technician to intervene to adjust the wake-up model.

According to the method for outputting information provided in above embodiments of the present disclosure, after a wake-up model is trained, the wake-up model may be verified by using feature information of voice information including a wake-up word, so that validity of the trained wake-up model is ensured, and a technician is reminded in time when the wake-up model is invalid.

Figure 5:
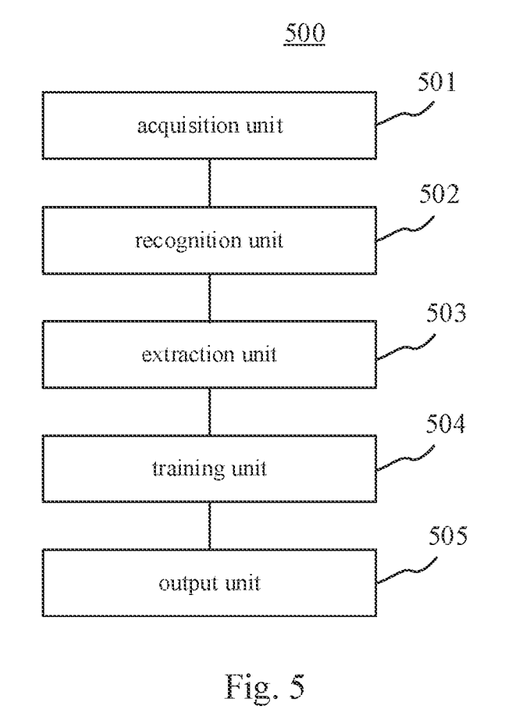
FIG. 5 is a schematic structural diagram of an embodiment of an apparatus for outputting information according to some embodiments of the present disclosure.

With further reference to FIG. 5, as an implementation of the method shown in above figures, the present disclosure provides an embodiment of an apparatus for outputting information, which corresponds to the method embodiment shown in FIG. 2, and which is particularly applicable to various electronic devices.

As shown in FIG. 5, an apparatus 500 for outputting information according to the present embodiment includes an acquisition unit 501, a recognition unit 502, an extraction unit 503, a training unit 504, and an output unit 505.

The acquisition unit 501 is configured to acquire voice information received within a preset time period before the device is awakened. The apparatus is provided with a wake-up model for outputting preset response information when a preset wake-up word is received.

The recognition unit 502 is configured to perform speech recognition on the voice information to obtain a recognition result.

The extraction unit 503 is configured to extract the feature information of the voice information in response to determining that the recognition result does not include the preset wake-up word.

The training unit 504 is configured to generate a counterexample training sample based on the feature information.

The output unit 505 is configured to train the wake-up model using the counterexample training sample, and output the trained wake-up model.

In some alternative implementations of the present embodiment, the training unit 504 is further configured to input the feature information of the voice information including the wake-up word into the trained wake-up model, and determine whether the preset response information is output; and output the trained wake-up model in response to outputting the preset response information.

In some alternative implementations of the present embodiment, the apparatus 500 may further include an alarm unit not shown in FIG. 5, configured to input the feature information of the voice information including the wake-up word into the trained wake-up model, and determine whether the preset response information is outputted; and output the trained wake-up model in response to outputting the preset response information.

In some alternative implementations of the present embodiment, the training unit 504 is further configured to determine a number of example training samples; training the wake-up model with the counterexample training samples in response to the number of counterexample training samples being greater than or equal to a preset number threshold.

In some alternative implementations of the present embodiment, the acquiring unit 501 is further configured to acquire voice information received within a preset time period before the device is awakened in response to waking the device by a preset wake-up word.

It should be understood that the units 501 to 505 described in the apparatus 500 for outputting information correspond to the respective steps in the method described with reference to FIG. 2, respectively. Thus, the operations and features described above with respect to the method for outputting information are equally applicable to the apparatus 500 and the units contained therein, and details are not described herein.

According to an embodiment of the present disclosure, the present disclosure further provides an electronic device and a readable storage medium.

Figure 6:
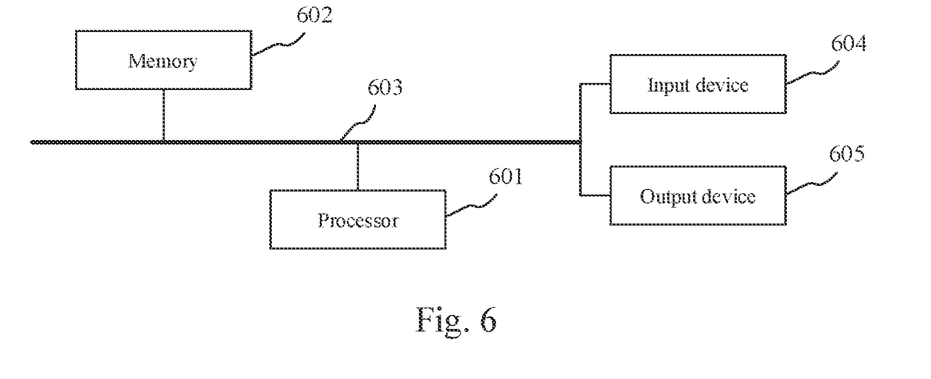
FIG. 6 is a schematic structural diagram of a computer system adapted for implementing a server according to some embodiments of the present disclosure.

FIG. 6 is a block diagram of an electronic apparatus for outputting information according to some embodiments of the present disclosure. The electronic device is intended to represent various forms of digital computers, such as laptop computers, desktop computers, worktables, personal digital assistants, servers, blade servers, mainframe computers, and other suitable computers. The electronic device may also represent various forms of mobile devices, such as personal digital processing, cellular phones, smart phones, wearable devices, and other similar computing devices. The components shown herein, their connections and relationships, and their functions are merely examples, and are not intended to limit the implementation of the present disclosure described and/or claimed herein.

As shown in FIG. 6, the electronic device includes one or more processors 601, a memory 602, and an interface for connecting components, including a high speed interface and a low speed interface. The various components are interconnected by different buses 603 and may be mounted on a common motherboard or otherwise as desired. The processor may process instructions executed within the electronic device, including instructions stored in or on a memory to display graphical information of the GUI on an external input/output device, such as a display device coupled to an interface. In other embodiments, multiple processors and/or multiple buses 603 may be used with multiple memories and multiple memories, if desired. Similarly, a plurality of electronic devices may be connected, each providing a portion of the necessary operations (e.g., as a server array, a set of blade servers, or a multiprocessor system). A processor 601 is exemplified in FIG. 6.

The memory 602 is a non-transitory computer readable storage medium provided by some embodiments of the present disclosure. The memory stores instructions executable by at least one processor to cause the at least one processor to perform the method for outputting information provided by some embodiments of the present disclosure. The non-transitory computer readable storage medium of some embodiments of the present disclosure stores computer instructions for causing a computer to perform the method for outputting information provided by some embodiments of the present disclosure.

The memory 602, as a non-transitory computer readable storage medium, may be used to store non-transitory software programs, non-transitory computer executable programs and modules, such as program instructions/modules corresponding to the method for outputting information in some embodiments of the present disclosure (for example, the acquisition unit 501, the recognition unit 502, the extraction unit 503, the training unit 504, and the output unit 505 shown in FIG. 5). The processor 601 executes the non-transitory software programs, instructions, and modules stored in the memory 602 to execute various functional applications and data processing of the server, that is, to implement the method for outputting information in the foregoing method embodiment.

The memory 602 may include a storage program area and a storage data area, where the storage program area may store an operating system and an application program required by at least one function; and the storage data area may store data or the like created by the use of the electronic device performing the method for outputting information. In addition, the memory 602 may include a high-speed random access memory, and may also include a non-transitory memory, such as at least one magnetic disk storage device, a flash memory device, or other non-transitory solid-state storage devices. In some embodiments, the memory 602 may optionally include memories remotely disposed with respect to the processor 601, and these remote memories may be connected to the electronic device performing the method for outputting information through a network. Examples of the above network include but are not limited to the Internet, intranet, local area network, mobile communication network, and combinations thereof.

The electronic device performing the method for outputting information may further include input means 604 and output means 605. The processor 601, the memory 602, the input device 604, and the output device 605 may be connected via a bus 603 or otherwise, as illustrated in FIG. 6.

The input device 603 may receive input digital or character information, and generate key signal inputs related to user settings and function control of the electronic device of the method for outputting information, such as touch screen, keypad, mouse, trackpad, touchpad, pointing stick, one or more mouse buttons, trackball, joystick or the like. The output device 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input device, and at least one output device, and transmit the data and instructions to the storage system, the at least one input device and the at least one output device.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display device for displaying information to the user (for example, CRT (cathode ray tube) or LCD (liquid crystal display) monitor); and a keyboard and a pointing device (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

According to the technical solution of embodiments of the present disclosure, the voice information of false wake-up may be used as a counterexample sample to train the wake-up model, no additional corpus recording is required, cost is saved, false wake-up can be automatically suppressed, and the accuracy of the wake-up can be improved.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for outputting information, the method comprising:
    acquiring voice information received within a preset time period before a device is awakened, wherein the device is provided with a wake-up model for outputting preset response information when a preset wake-up word is received;
    performing speech recognition on the voice information to obtain a recognition result;
    extracting feature information of the voice information in response to determining that the recognition result does not include the preset wake-up word;
    generating a counterexample training sample based on the feature information; and
    training the wake-up model using the counterexample training sample, and outputting a trained wake-up model, wherein the training is performed by using a new wake-up word included in the voice information in the counterexample training sample as an input, and using null information as an expected output.

2. The method according to claim 1, wherein the training the wake-up model using the counterexample training sample and outputting the trained wake-up model comprises:
    inputting the feature information of the voice information comprising the preset wake-up word into the trained wake-up model, and determining whether the preset response information is output; and
    outputting the trained wake-up model in response to outputting the preset response information.

3. The method according to claim 2, wherein the method further comprises:
    in response to not outputting the preset response information, outputting alarm information.

4. The method according to claim 1, wherein the training the wake-up model using the counterexample training sample, and outputting the trained wake-up model comprises:
    determining a number of the counterexample training samples; and
    training the wake-up model with the counterexample training samples in response to the number of the counterexample training samples being greater than or equal to a preset number threshold.

5. The method according to claim 4, wherein the acquiring voice information received within a predetermined time period before a device is awakened comprises:
    in response to the device being awakened by the preset wake-up word, acquiring the voice information received within the preset time period before the device is awakened.

6. A server comprising:
    one or more processors;
    a storage apparatus storing one or more programs,
    wherein the one or more programs, when executed by the one or more processors, cause the one or more processors to perform operations, the operations comprising:
    acquiring voice information received within a preset time period before a device is awakened, wherein the device is provided with a wake-up model for outputting preset response information when a preset wake-up word is received;
    performing speech recognition on the voice information to obtain a recognition result;

extracting feature information of the voice information in response to determining that the recognition result does not include the preset wake-up word;

generating a counterexample training sample based on the feature information; and training the wake-up model using the counterexample training sample, and outputting a trained wake-up model, wherein the training is performed by using a new wake-up word included in the voice information in the counterexample training sample as an input, and using null information as an expected output.

7. The server according to claim 6, wherein the training the wake-up model using the counterexample training sample, and outputting the trained wake-up model comprises:

inputting the feature information of the voice information comprising the preset wake-up word into the trained wake-up model, and determining whether the preset response information is output; and outputting the trained wake-up model in response to outputting the preset response information.

8. The server according to claim 7, wherein the operations further comprises:

in response to not outputting the preset response information, outputting alarm information.

9. The server according to claim 6, wherein the training the wake-up model using the counterexample training sample, and outputting the trained wake-up model comprises:

determining a number of the counterexample training samples; and training the wake-up model with the counterexample training samples in response to the number of the counterexample training samples being greater than or equal to a preset number threshold.

10. The server according to claim 9, wherein the acquiring voice information received within a predetermined time period before a device is awakened comprises:

in response to the device being awakened by the preset wake-up word, acquiring the voice information received within the preset time period before the device is awakened.

11. A non-transitory computer readable medium storing a computer program, wherein the computer program, when executed by a processor, causes the processor to perform operations, the operations comprising:

acquiring voice information received within a preset time period before a device is awakened, wherein the device is provided with a wake-up model for outputting preset response information when a preset wake-up word is received;

performing speech recognition on the voice information to obtain a recognition result;

extracting feature information of the voice information in response to determining that the recognition result does not include the preset wake-up word;

generating a counterexample training sample based on the feature information; and training the wake-up model using the counterexample training sample, and outputting a trained wake-up model, wherein the training is performed by using a new wake-up word included in the voice information in the counterexample training sample as an input, and using null information as an expected output.

12. The non-transitory computer readable medium according to claim 11, wherein the training the wake-up model using the counterexample training sample and outputting the trained wake-up model comprises:

inputting the feature information of the voice information comprising the preset wake-up word into the trained wake-up model, and determining whether the preset response information is output; and outputting the trained wake-up model in response to outputting the preset response information.

13. The non-transitory computer readable medium according to claim 12, wherein the operations further comprises:

in response to not outputting the preset response information, outputting alarm information.

14. The non-transitory computer readable medium according to claim 11, wherein the training the wake-up model using the counterexample training sample, and outputting the trained wake-up model comprises:

determining a number of the counterexample training samples; and training the wake-up model with the counterexample training samples in response to the number of the counterexample training samples being greater than or equal to a preset number threshold.

15. The non-transitory computer readable medium according to claim 14, wherein the acquiring voice information received within a predetermined time period before a device is awakened comprises:

in response to the device being awakened by the preset wake-up word, acquiring the voice information received within the preset time period before the device is awakened.

* * * * *